United States Patent [19]

Ohara et al.

[11] 4,384,297
[45] May 17, 1983

[54] LASER RECORDER REPRODUCING A PICTURE HAVING HALF-TONES OF HIGH ACCURACY

[75] Inventors: Yuji Ohara; Masahiro Ohnishi, both of Asaka, Japan

[73] Assignee: Fuji Photo Film Co., Ltd., Kanagawa, Japan

[21] Appl. No.: 258,696

[22] Filed: Apr. 29, 1981

[30] Foreign Application Priority Data

Apr. 30, 1980 [JP] Japan .................................. 55-57264

[51] Int. Cl.³ ............................................ G01D 15/10
[52] U.S. Cl. .................................. 346/108; 346/76 L; 358/298
[58] Field of Search ................ 346/108, 76 L; 354/4; 358/298, 296, 302; 369/47

[56] References Cited

U.S. PATENT DOCUMENTS 3,294,896 12/1966 Young .............................. 358/298 X
3,656,175 4/1972 Carlson et al. ................... 346/76 L Primary Examiner—Stafford D. Schreyer
Attorney, Agent, or Firm—Sughrue, Mion, Zinn, Macpeak and Seas

[57] ABSTRACT

A laser recorder in which pictures with gradations at equal density intervals are reproduced with a high accuracy. An input analog video signal is sampled with a sampling pulse at a predetermined sampling rate. For each value of the sampled input signal, a number of high frequency pulses are outputted to modulate a semiconductor laser. The high frequency pulses are outputted so as to be distributed substantially in equal numbers on either side of the center of each sampling period.

8 Claims, 11 Drawing Figures

LASER RECORDER REPRODUCING A PICTURE HAVING HALF-TONES OF HIGH ACCURACY

BACKGROUND OF THE INVENTION

The present invention relates to a recording device using a semiconductor laser which is capable of reproducing a picture such as a photograph having half-tones with a high accuracy.

To intensity modulate a laser beam to record the image of a picture having half-tones, any of (1) a technique of using an ultrasonic optical modulator, (2) a technique of varying the discharge current of a gas laser, and (3) a technique of varying the current of a semiconductor laser may be employed.

The first technique is disadvantageous in that it uses an expensive ultrasonic optical modulator and mechanism for finely adjusting a modulator to the Bragg angle and hence, as a whole, has a high manufacturing cost and intricate construction.

The second technique of varying the discharge current of the gas laser is also disadvantageous in that the modulation frequency is low, several hundred Hertz, and the service life of the laser tube is reduced due to variations of the discharge current.

The third technique of varying the current of the semiconductor laser is disadvantageous in that, since the semiconductor laser has an optical output vs. current characteristic as shown in FIG. 1, the optical output is greatly changed merely by slightly changing the input current thereto, and accordingly it is considerably difficult to record an image having half-tones by controlling the optical output in an analog mode by varying the applied current.

Accordingly, an object of the invention is to provide a laser recorder which can reproduce half-tones with high accuracy.

The invention is intended to improve the quality of a picture which is produced by a laser recorder in which, as disclosed in U.S. patent application Ser. No. 214,815 filed Dec. 9, 1980, an input signal is sampled with a sampling pulse signal, a high frequency pulse signal having a frequency of at least 10 Hz is generated using the sampling pulse signal, and the number of high frequency pulses which are outputted during a sampling period is controlled and applied to a semiconductor laser.

The term "sampling pulse" or "sampling pulse signal" as herein used is intended to mean a pulse or pulse signal for sampling an input video signal at predetermined time intervals. The frequency of the sampling pulse signal may be selected as desired although it is preferable, in order to reproduce the picture with a high resolution, that the frequency be slightly higher than the maximum frequency of the input video signal. Furthermore, the term "high frequency pulse signal" is intended to mean a pulse signal having a frequency higher than that of the sampling pulse signal, preferably several hundred to several thousand Hertz. These two pulse signals may be generated independently of each other. However, it is desirable that the sampling pulse signal be obtained by frequency-dividing the high frequency pulse signal.

The amount of exposure of each of the picture elements which form a picture is defined by the number of high frequency pulses which are applied to a semiconductor laser according to the level of an input video signal during a sampling period. If the optical energy of the semiconductor laser applied to a photosensitive material corresponding to one high frequency pulse is represented by $\Delta e$, and the number of high frequency pulses which are provided for a picture element according to the level of an input video signal is represented by N, the total optical energy, i.e. the exposure E applied to the picture element is:

$$E = N \cdot \Delta e. \tag{1}$$

The number of high frequency pulses not only corresponds linearly to the input signal, but also may take into account the logarithmic conversion of the input signal and characteristics of a recording material employed, or a predetermined stored input and output characteristic. The term "input signal" as herein used is intended to mean a video signal, which may be either an analog signal or a digital signal.

The relation between the number of pulses and the density of a recorded image where the image is recorded with a semiconductor laser which is controlled by the number of high frequency pulses applied thereto will be described with reference to FIG. 2.

Curve I in FIG. 2 is a characteristic curve of a recording material. More specifically, it is an example of the relation between the logarithmic value of the exposure E and the density D. Curve II in FIG. 2 is an example of the relation between the number N of high frequency pulses outputted and the logarithmic value of the exposure E for the recording material obtained from the number N.

Once a density level is selected in FIG. 2, the corresponding number N of high frequency pulses can be obtained as indicated by the arrows in FIG. 2. If, for instance, the density D is changed from 0.1 to 0.2 in the low density part of FIG. 2, the pulse number N is increased only by about nine pulses. However, if the density D is changed from 1.3 to 1.4 in the high density part of the curve, it is necessary to increase the pulses number N by about 50 pulses.

As is apparent from the about description, in order to reproduce gradations at equal density intervals with a sufficiently high accuracy, the frequency of the high frequency pulse signal must be much higher than that of the sampling pulse signal, for instance higher by several hundred to several thousand times.

SUMMARY OF THE INVENTION

A semiconductor laser is advantageous in that it can be pulse-modulated at a high rate. Based on this fact, a semiconductor laser is subjected to pulse-number modulation with high frequency pulses in accordance with the invention. More specifically, in accordance with the invention, a number of high frequency pulses whose frequency is higher by two or three orders of magnitude than that of the sampling frequency applied to the semiconductor laser is controlled to modulate the intensity of the semiconductor laser. A specific feature of the invention is that, in order to improve the quality of a recorded image, outputted high frequency pulses are distributed in substantially equal numbers on both sides of the center of each sampling period.

DESCRIPTION OF THE PREFERRED EMBODIMENTS

The invention will be described with reference to preferred embodiments.

Figure 3:
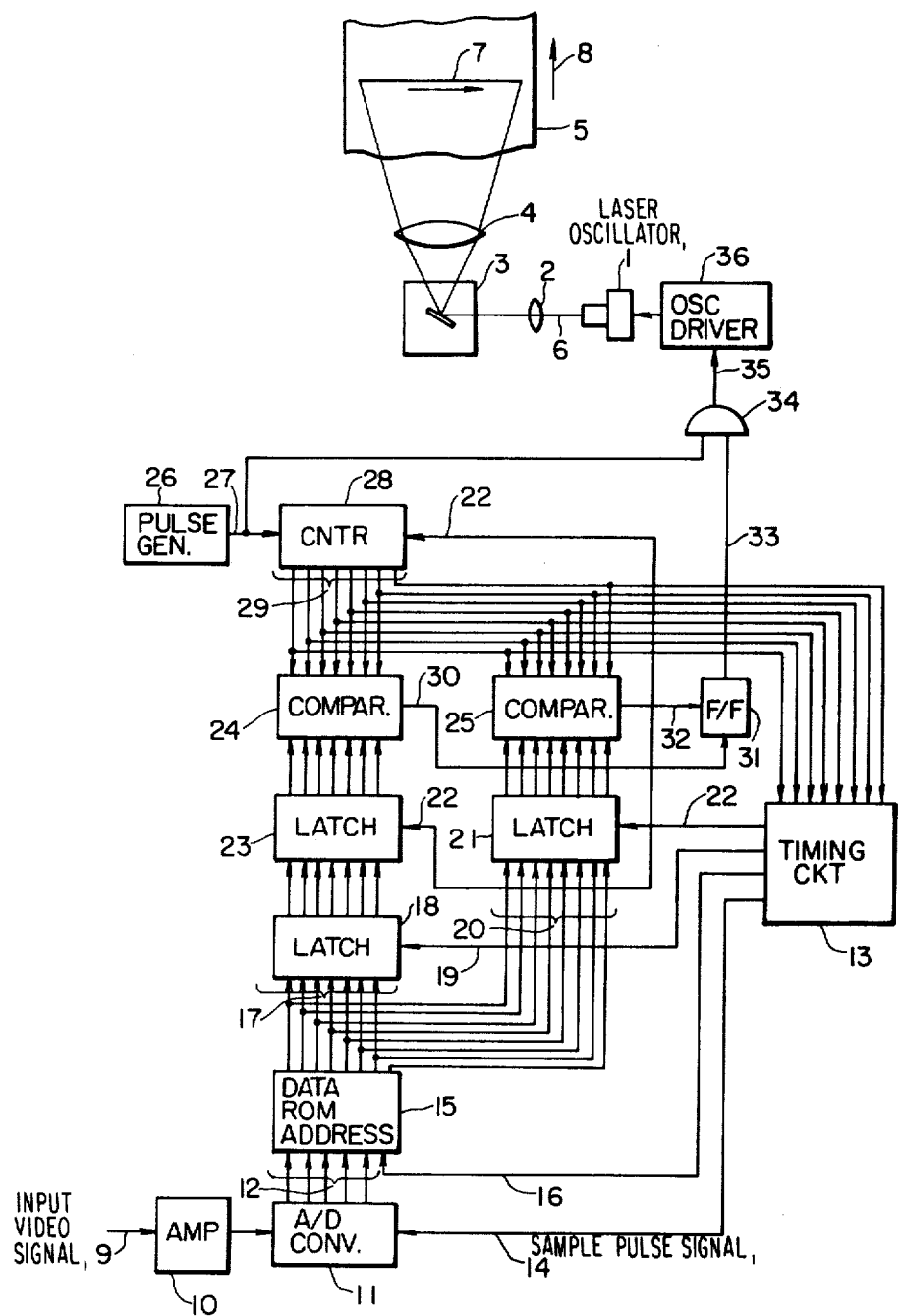
FIG. 3 is a block diagram of a preferred embodiment of a laser recorder of the invention.

In the embodiment of the invention shown in FIG. 3, reference numeral 1 designates a semiconductor laser oscillator, 2 a beam shaping lens, 3 a deflector, 4 a focusing lens, and 5 a recording sheet. It is desirable that the recording sheet 5 be a silver-salt photographic type or an electronic photographic type which can reproduce half-tones and is sensitive to the wavelength of a semiconductor laser beam (red or infrared wavelength). A semiconductor laser beam 6, which is current-pulse modulated, is collimated by the beam shaping lens 2. Deflected by the deflector 3 and formed into a predetermined spot size by the focusing lens 4 thereby creating a laser beam used to preform a main scanning operation on the recording sheet 5 to draw scanning lines 7 thereon. Auxiliary scanning is carried out by moving the recording sheet 5 in the direction of the arrow 8. In this embodiment, a galvanometer is employed as the deflector 3.

A semiconductor laser modulating method will now be described.

A particular feature of a semiconductor laser is that it can be pulse-modulated with a high frequency of up to several hundred megahertz (MHz). The quantity of semiconductor laser light output can be controlled by controlling the number of modulating pulses applied to the laser (hereinafter referred to as "a pulse-number" when applicable). For instance, if, in the case where the maximum frequency of the video signal is 10 KHz, a video signal sampled at 10 KHz is pulse-modulated at 10 MHz and the pulse number is controlled, the laser beam can be subjected to pulse modulation using from 0 to 1,000 pulses, whereby the half-tones of the picture can be recorded with a high accuracy.

An example of such a pulse modulation technique will be described with reference to FIG. 3. An input video signal 9 is amplified by a waveform shaping amplifier 10 to a predetermined level. The video signal 9 is, for instance, a facsimile input signal representative of the density of the original picture.

Figure 1:
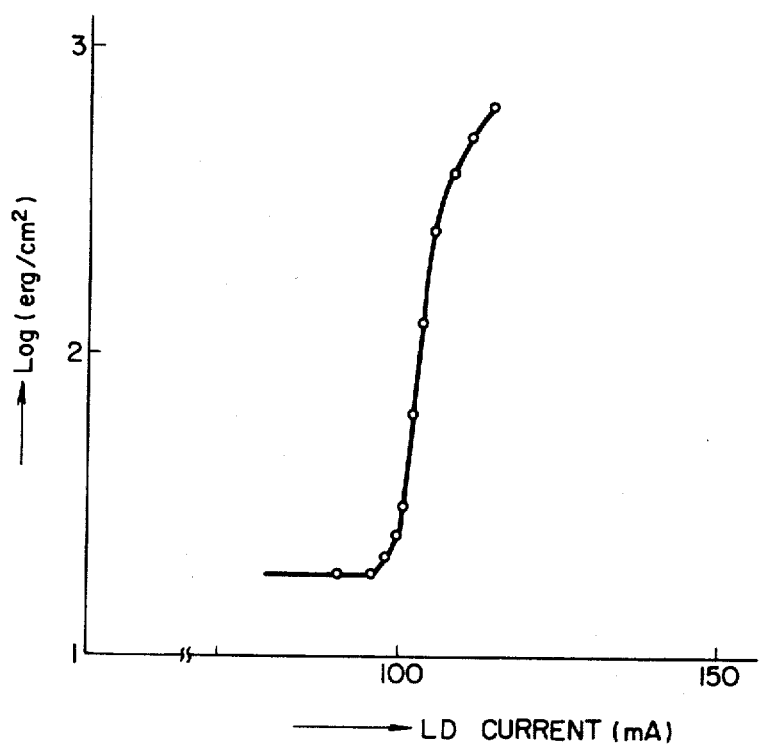
FIG. 1 is a graphical representation showing an example of a current vs. optical output characteristics of a semiconductor laser.
Figure 2:
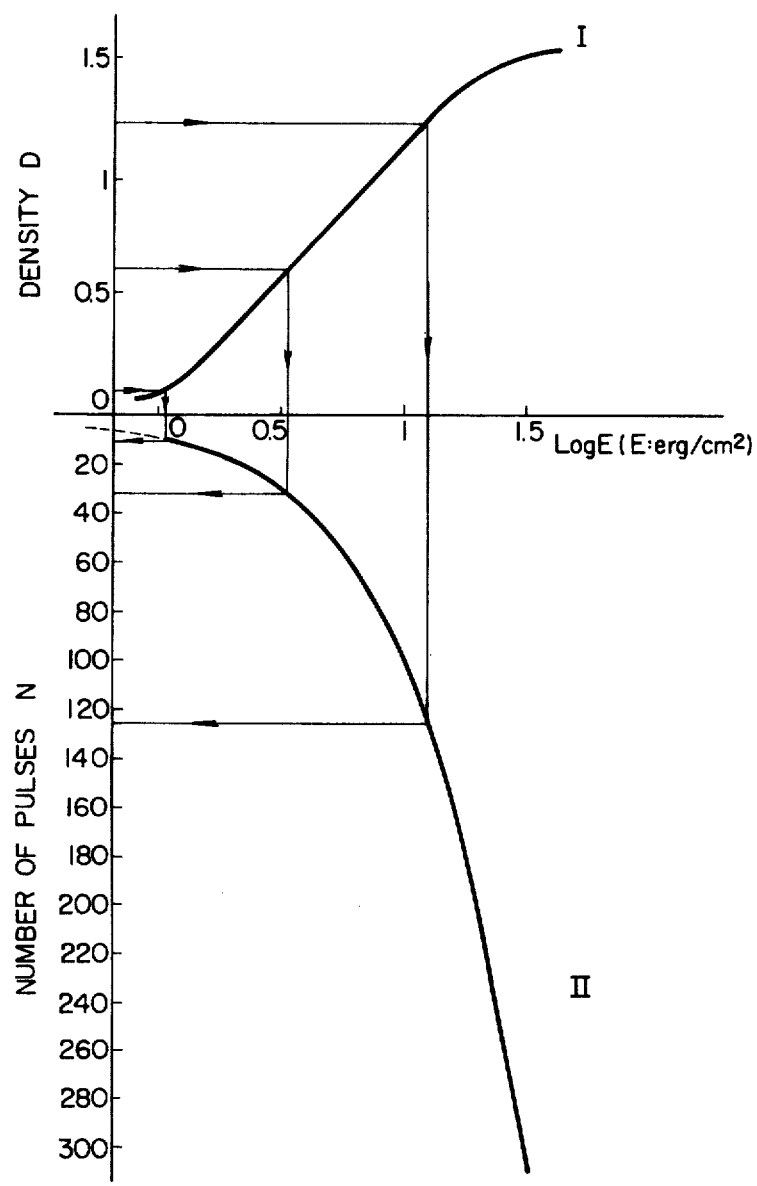
FIG. 2 is a graphical representation of an example of a relation between a density level to be reproduced and a corresponding number of modulating pulses.

The input signal thus waveform-shaped is applied to A/D (analog-to-digital) converter 11 where it is quantized, for instance, into a 5-bit digital signal 12. The A/D converter 11, the operation of which is controlled by a sampling pulse 14 outputted by a timing circuit 13, holds the digital signal until the next sampling pulse is applied thereto. The digital signal 12 is inputted to a digital value collation circuit 15. The digital value collation circuit 15 operates to output a high frequency pulse number N corresponding to an input signal level, i.e. a density level D as described with reference to FIG. 2. The circuit 15 may be implemented with a PROM (programmable read-only memory). In this use, the bits of the input signal 12 are applied as an address signal to the circuit 15, in response to which the circuit 15 outputs the high frequency pulse number N which is stored at that address.

In the above-described embodiment, the signal from the facsimile transmitter is a signal representative of the density of the original picture which is in the form of a logarithmic conversion signal. However, if a signal in logarithmic form is inputted, a circuit for carrying out logarithmic conversion can be included in the digital value conversion circuit.

In the embodiment described, the bits of the input signal 12 are applied in sequence to the first address input bit through the fifth address input bit of the digital value collation circuit 15 and an address switching signal 16 from the timing circuit 13 is applied to the sixth address input bit of the circuit 15.

Figure 4:
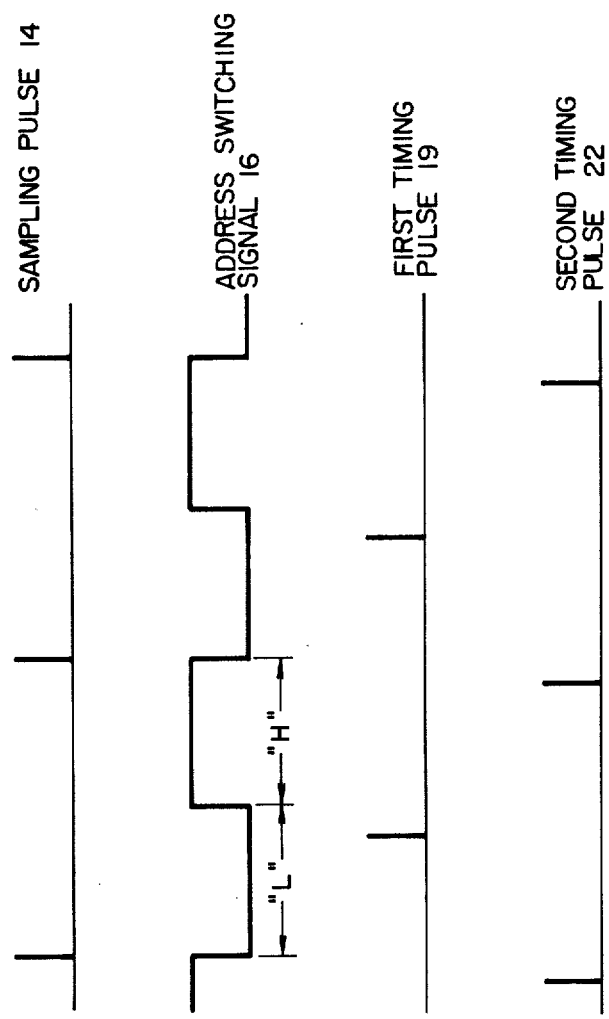
FIGS. 4 and 5i–5vi are timing charts for a description of the operation of the laser recorder shown in FIG. 3.

The relation between the sampling pulse signal 14 and the address switching signal 16 is shown in FIG. 4. Specifically, the address switching signal 16 assumes a low logical level "L" and a high logical level "H" alternately during each sampling period. Accordingly, the digital value collation circuit 15 outputs two types of data successively in response to the address input which is specified by the combination of the 5-bit input signal 12 and the address switching signal 16. A first data word 17 which is outputted by the digital value collation circuit 15 when the address switching signal 16 is at "1" is inputted to a first latch circuit 18 and is latched therein in response to a pulse of a first timing pulse signal 19 from the timing circuit 13. On the other hand, a second data word 20 which is outputted by the digital value collation circuit 15 when the address switching signal 16 is at "H" is applied to a second latch circuit 21 and is latched therein in response to a pulse of a second timing pulse signal 22 from the timing circuit 13. At the same time, the first data word 17 latched by the first latch circuit 18 is applied to a third latch circuit 23 and is latched upon receipt of a pulse of the second timing pulse signal 22. The first data word 17 latched by the latch circuit 23 is applied to a first input port of a first comparison circuit 24 while the second data word 20 latched by the second latch circuit 21 is applied to a first input port of a second comparison circuit 25.

Pulses of the first timing pulse signal 19, as shown in FIG. 4, are outputted when the address switching signal is at "L" and the first data word 17 outputted by the digital value collation 15 is stable. Similarly, pulses of the second timing pulse signal are outputted when the address switching signal 16 is raised to "H" and the second data word 20 outputted by the digital collation circuit 15 is stable.

A counter circuit 28 operates to count pulses of a high frequency pulse signal 27 which are outputted by a high frequency pulse generator 26. The count value 29 of the counter circuit 28 is applied to a second input port of the first comparison circuit 24 and to a second input port of the second comparison circuit 25. The count value 29 is further applied to the timing circuit 13. The timing circuit 13 produces the above-described sampling pulse signal 14, address switching signal 16, first timing pulse signal 19 and second timing pulse signal 22 according to the content of the count value 29. The second timing pulse signal 22 is further applied to the clear terminal of the counter 28.

Figure 6:
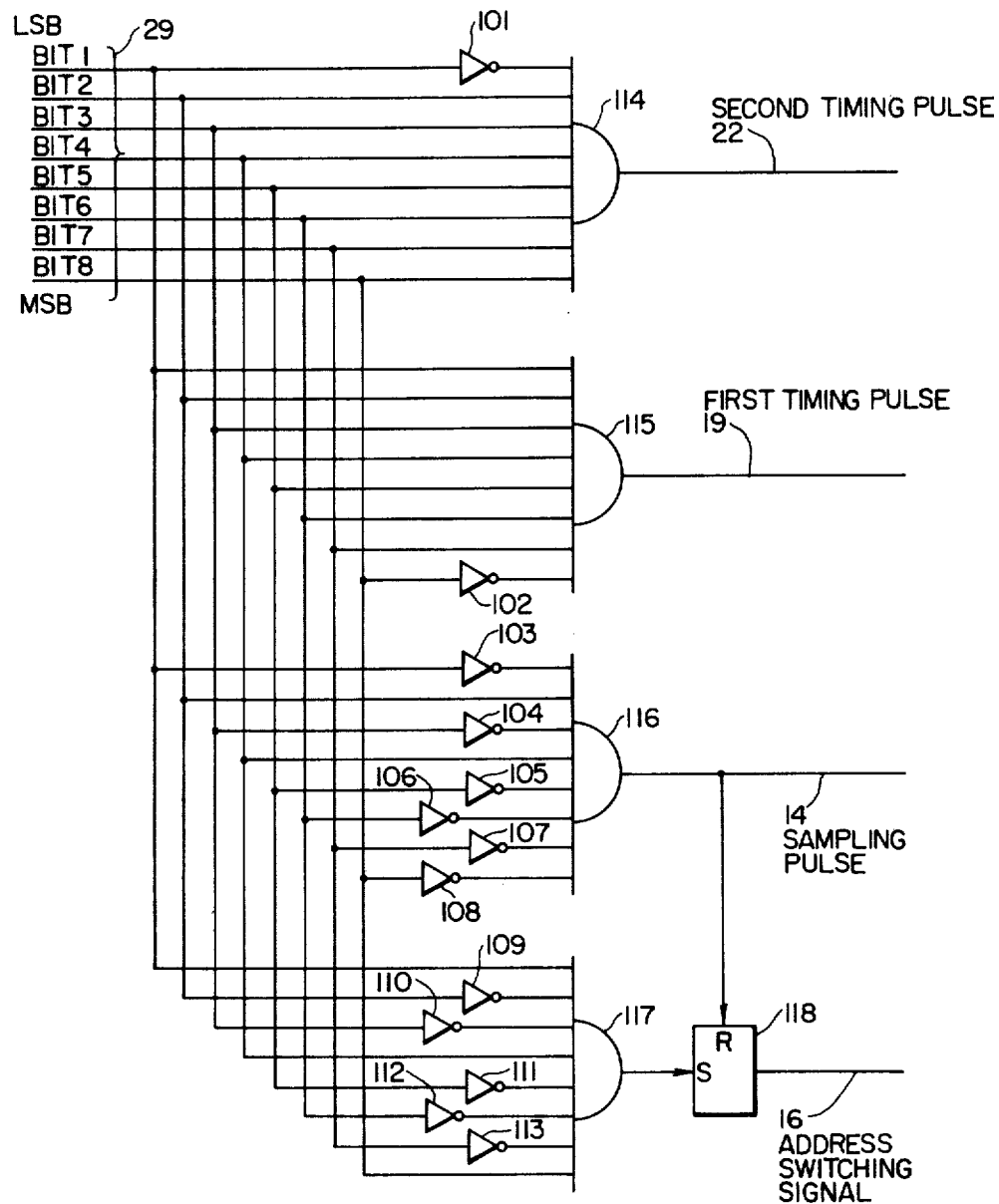
FIG. 6 is a schematic diagram of a timing circuit used on the laser recorder of FIG. 3.

The timing circuit 13 will be described in more detail with reference to FIG. 6 which is a circuit diagram showing an example of the timing circuit 13 which includes inverters 101-113, AND gates 114-117 and a flip-flop 118.

In this example of the timing circuit 13, the second timing pulse signal 22 is generated when the count value 29 of the counter circuit 28 is equal to 254 by the inverter 101 and the AND gate 114. The first timing pulse signal 19 is generated when the count value 29 is equal to 127 by the inverter 102 and the AND gate 115. The sampling pulse signal 14 is generated when the count value 29 is equal to 10 by the inverters 103-108 and the AND gate 116. Further, a signal generated when the count value 29 is equal to 137 by the inverters 109-113 and the AND gate 117 is applied to the set terminal of the flip-flop 118 while the sampling pulse is applied to the reset terminal thereof. Thus, the address switching signal 16 outputted from the flip-flop 118 is at a logic level "L" when count value 29 is increasing from 10 to 137 and is "H" when the count value 29 is decreasing from 137 back to 10. In this example, although the time from the generation of the sampling pulse signal 14 until the generation of the first timing pulse 19 is set to be the time period for 117 counting time increments (=127−10), the first timing pulse signal 19 may be outputted insofar as the following condition is satisfied. That is, it may be outputted when the input video signal 9 quantized by the A/D converter 11 with the timing of the sampling pulse signal 14 is converted to the input digital signal 12 and the first data word 17 from the digital value collation circuit 15 is stably outputted when the address switching signal 16 is "L." It should accordingly be noted that setting of the variation of the count value 29 from the generation of the sampling pulse signal 14 to that of the first timing pulse 19 is given merely as an example. It should further be noted that the time relation given between the sampling pulse 14 and the second timing pulse 22 is only one example thereof.

When the first data word 17 applied to the first input port of the first comparison circuit 24 coincides with the count value 29 of the counter circuit 28, the first comparison circuit 24 outputs a first coincidence signal 30 which sets a flip-flop 31. On the other hand, when the second data word 20 applied to the first input port of the second comparison circuit 25 coincides with the count value 29 of the counter circuit 28, the second comparison circuit 25 outputs a second coincidence signal 32 which resets the flip-flop 31. The output signal 33 from the flip-flop circuit 31 is applied to one input terminal of an AND gate 34 to the other input terminal of which the output high frequency pulse signal 27 from the high freqency pulse generator 26 is applied. The high frequency pulse signal 27 passes through the AND gate 34 only when the gate signal 33 is at "H." The output high frequency pulse signal 35 from the AND gate 34 is applied to the semiconductor laser oscillator driving circuit 36 to on-off control the output of the semiconductor laser oscillator 1.

Figure 5:
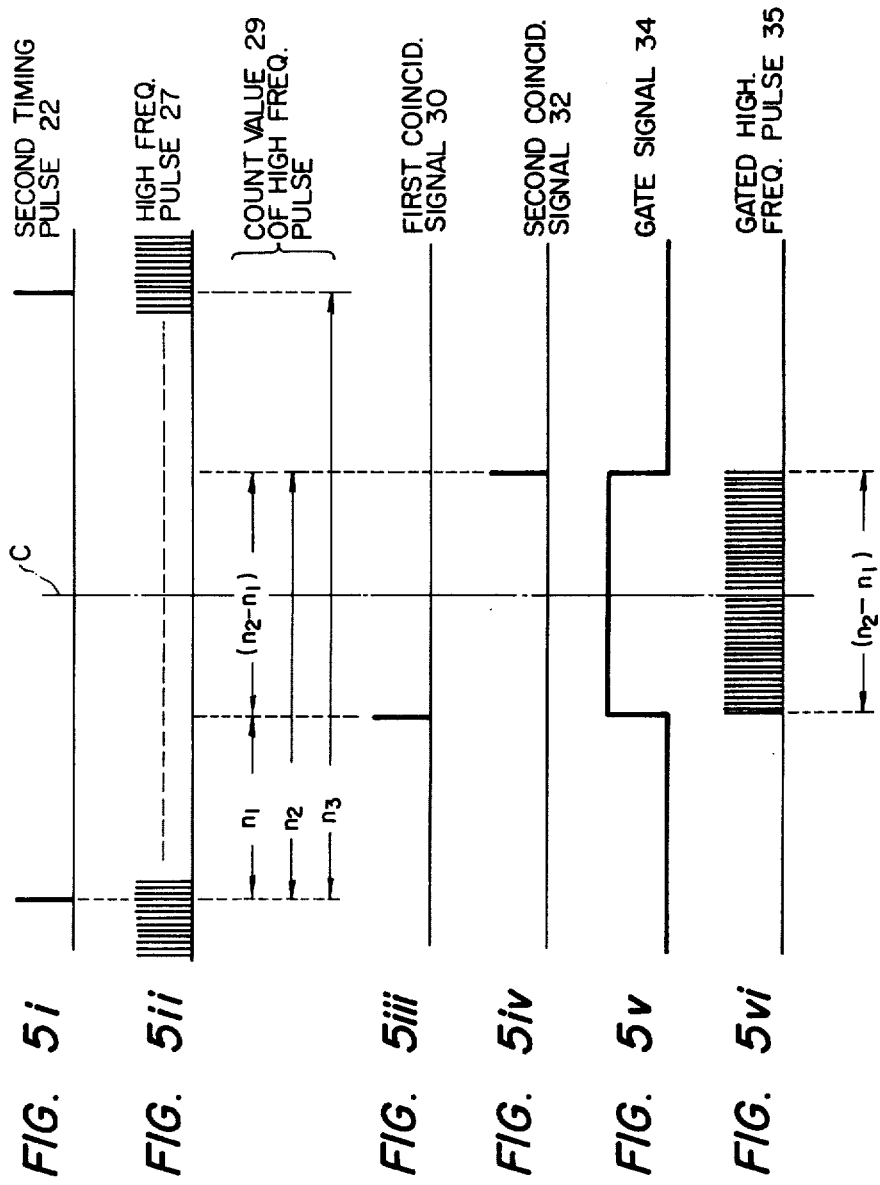

The above-described operation will be described in more detail with reference to the timing chart in FIG. 5.

When a pulse of the second timing pulse 22 (FIG. 5i) is outputted by the timing circuit 13, the content of the counter circuit 28 is reset to zero while the latch circuits 23 and 21 latch the first data word 17 and the second data word 20, respectively.

The first data word 17 causes the gate signal 33 (FIG. 5v) to rise. If the value of the data word 17 is $n_1$ when the count value 29 of the counter circuit 28 increases to $n_1$ from zero, the first comparison circuit 24 outputs the first coincidence signal 30 (FIG. 5iii) which sets the flip-flop 31. On the other hand, the second data word 20 causes the gate signal 33 (FIG. 5v) to fall. If the value of the data word 20 is $n_2$ when the count value 29 of the counter circuit 28 increases to $n_2$ from zero, the second comparison circuit 25 outputs the second coincidence signal 32 (FIG. 5iv) resetting the flip-flop 31. Thus, the gate circuit 34 provides ($n_2 - n_1$) high frequency pulses as indicated in FIG. 5vi. A pulse of the second timing pulse signal 22 (FIG. 5i) is outputted whenever the counter circuit 28 counts $n_3$ high frequency pulses 27 (FIG. 5ii).

One of the features of the invention is that high frequency pulses are distributed substantially equal in number on either side of the center of each sampling period. In the preferred embodiment described, the values $n_1$, $n_2$ and $n_3$ (integers) are determined as follows:

Assuming that densities of up to 1.4 are to be reproduced on the photosensitive material 5 it is necessary to provide 0 (minimum) to 254 (maximum) high frequency pulses for each input signal level during each sampling period. Therefore, in order to provide 254 high frequency pulses at the maximum during each sampling period where the sampling pulse frequency $f_s$ is 10 KHz, the high frequency pulse frequency $f_H$ should be as follows:

$$f_H \geq 254 \times f_s.$$

In the preferred embodiment, $f_H$ is set, as an example, to 2.54 MHz.

Thus, the timing circuit 13 outputs the second timing signal 22 whenever the count value 29 of the counter circuit 28 reaches 254. If the maximum number 254 of high frequency pulses is provided during a sampling period, the high frequency pulses are continuously outputted throughout the sampling period. If the high frequency pulse frequency $f_H$ is increased, the time interval from the instant that the maximum number 254 of high frequency pulses has been outputted during a sampling period until the next sampling period may be employed as a pause period in which no high frequency pulses are outputted. As used herein, the term "sampling period" is intended to mean the period of the second timing pulse signal 22 described with reference to FIGS. 4 and 5 rather than the period of the sampling pulse signal 14 shown in FIG. 4. However, the invention is not limited thereto or thereby.

As is apparent from the above description, the value of the integer $n_3$ is 254. The count value of the high frequency pulses at the center of each sampling period, i.e. at the center (indicated at C) of the period of the second timing pulse 22, is: 127=254/2. Therefore, if the number N of high frequency pulses which are provided for an input signal level is 100 (N=100), the high frequency pulses are distributed equally on either side of the center of the sampling period. Therefore $n_1 = 50$, and $n_2 = 150$. As described above, these values are stored as the data words 17 and 20 in the digital value collation circuit 15 and are read out of the circuit 15 when required. The number N of high frequency pulses may be an odd number. In this case, the high frequency pulses are distributed in such a manner that the number of high frequency pulses on one side of the center of the sampling period is larger by one than the number of high frequency pulses on the other side.

As is apparent from the above description, no matter what the level of the input signal is, the ideal center of a picture element and the center of the actually recorded picture element are made to be substantially coincident with one another.

The use of the invention eliminates the problem that the ideal center of a picture element is shifted from the actually recorded picture element, i.e. the center of a picture element is shifted on the photosensitive material because the high frequency pulses outputted are shifted towards the left-hand end of the sampling period depending on the input signal level. Accordingly, with the invention, no jittering or secondary moire effect is present. Thus, the accuracy in density reproduction is improved, and accordingly the quality of a reproduced picture is considerably improved.

The technical concept of the invention is applicable not only to a laser recorder in which half-tones are reproduced by controlling the number of high frequency pulses which are outputted during each sampling period, but also to a laser recorder in which, as disclosed in U.S. patent application Ser. No. 214,815 filed Dec. 9, 1980, the number of high frequency pulses is counted to control the width of pulses which are outputted during each sampling period thereby to reproduce half-tones with accuracy.

What is claimed is:

1. A laser recorder comprising: means for sampling an input signal at intervals corresponding to a predetermined sampling period; means for producing a burst of high frequency pulses during said sampling period, the number of said high frequency pulses in said burst being determined in accordance with a sampled value of said input signal sampled by said sampling means, and said high frequency pulses being distributed substantially in equal numbers on either side of a center of said sampling period; and means for generating a laser beam in response to pulses of said burst.

2. The laser recorder of claim 1 wherein said laser beam generating means comprises a semiconductor laser.

3. The laser recorder of claim 1 further comprising means for producing a sampling pulse signal, having a period equal to said predetermined sampling period.

4. A semiconductor laser recorder comprising: means for sampling an input signal at intervals corresponding to a predetermined sampling period; means for storing first and second digital words for corresponding values of the sampled input signal, said first and second digital words representing pulse numbers of high frequency pulses to be outputted during said sampling period, said pulses to be outputted during said sampling period being distributed substantially in equal numbers on either side of a center of said sampling period; means for generating said output pulses in response to said first and second words; a semiconductor laser; and means for modulating said semiconductor laser in response to said output pulses.

5. The laser recorder of claim 4 wherein said high frequency pulses distributed substantially in equal numbers on either side of said center of said sampling period are generated as a continuous burst.

6. A laser recorder comprising: an analog-to-digital converter, an input signal being coupled to an analog input of said analog-to-digital converter; a read-only memory, digital outputs of said analog-to-digital converter being coupled to predetermined address input bits of said read-only memory; a timing circuit for generating a sampling pulse signal, an address switching signal, a first timing pulse signal and a second timing pulse signal, said sampling pulse signal being coupled to a sampling pulse input of said analog-to-digital converter, said sampling pulse signal having a period equal to a sampling period, said address switching signal being a square wave signal having a period corresponding to said sampling period, a pulse of said first timing pulse signal being generated during a first logic state of said address switching signal and a pulse of said second timing pulse signal being generated during a second logic state of said address switching signal, said address switching signal being coupled to an address input bit of said read-only memory; first and second latches, said first timing pulse signal being coupled to a clock input of said first latch and said second timing pulse signal being coupled to a clock input of said second latch, said first and second latches having inputs coupled to data outputs of said read-only memory, wherein a first digital word stored in said read-only memory for a corresponding value of said input signal is stored in said first latch and a second digital word stored in said read-only memory for said corresponding value of said input signal is stored in said second latch; and a third latch having data inputs coupled to data outputs of said first latch and having a clock input coupled to said second timing pulse signal; a pulse generator for generating a continuous stream of high frequency pulses; a counter having a clock input coupled to an output of said pulse generator for producing a count in response to pulses received from said pulse generator; first and second comparators, said first and second comparators each having a first input port coupled to outputs of said counter, said first comparator having a second input port coupled to data outputs of said third latch and said second comparator having a second input port coupled to data outputs of said second latch; an S-R flip-flop having a set input coupled to a comparison output of said first comparator and a reset input coupled to a comparison output of said second comparator; an AND gate having a first input coupled to said output of said pulse generator and a second input coupled to an output of said flip-flop; a semiconductor laser; and a driver for modulating said laser in response to an output of said AND gate.

7. The laser recorder of claim 6 wherein said timing circuit comprises first through fourth decoders, said first through fourth decoders having an input coupled to said outputs of said counter, said first through fourth decoders producing output pulses in response to predetermined first through fourth output count values of said counter, said first count value being greater than said second count value, said second count value being greater than said third count value and said third count value being greater than said fourth count value, said second timing signal being produced at an output of said first decoder, said second timing pulse signal being produced at an output of said third decoder, and said sampling pulse signal being produced at an output of said fourth decoder; and a second S-R flip-flop, said output of said fourth decoder being coupled to a reset input of said second S-R flip-flop and an output of said second decoder being coupled to a set input of said second S-R flip-flop, said address switching signal being produced at an output of said second S-R flip-flop.

8. The laser recorder of any one of claims 1-7 wherein the period of said high frequency pulses is no greater than one-hundredth said sampling period.

* * * * *